Nov. 14, 1967 OSAMU GONMORI 3,352,976

REVERSIBLE TILTING DRIVE MECHANISM IN A MAGAZINE TYPE MAGNETIC TRANSDUCING APPARATUS

Filed May 13, 1963 4 Sheets-Sheet 1

INVENTOR
OSAMU GONMORI
BY: Darby & Darby
ATTORNEYS

INVENTOR
OSAMU GONMORI
BY: Darby & Darby
ATTORNEYS.

INVENTOR
OSAMU GONMORI
By: Darby & Darby
ATTORNEYS

INVENTOR
OSAMU GONMORI
By Darby & Darby
ATTORNEYS 3,352,976

REVERSIBLE TILTING DRIVE MECHANISM IN A MAGAZINE TYPE MAGNETIC TRANSDUCING APPARATUS

Osamu Gonmori, Gunma-ken, Japan, assignor to Sanyo Electric Co., Ltd., Moriguchi-shi, and Tokyo Sanyo Electric Co., Ltd., Gunma-ken, Japan, both corporations of Japan Filed May 13, 1963, Ser. No. 279,894
Claims priority, application Japan, May 14, 1962, 37/19,434; July 11, 1962, 37/29,262; and Feb. 11, 1963, 38/6,928
5 Claims. (Cl. 179—100.2)

This invention relates to magnetic recording and reproducing machines, particularly of magazine type.

The primary object of the present invention is to provide an improved magnetic recording and reproducing machine of magazine type in which the driving shaft of the machine may be introduced into or withdrawn from between two reels, upper and lower, rotatably disposed in superposed relation within the magazine, the driving shaft being adapted to make driving connection with either of the two reels, selectively, so that a simple and reliable changeover may be effected between recording-reproducing operations and rewinding of the magnetic tape.

Another object of the present invention is to provide the magnetic recording and reproducing machine of the kind above-specified, in which the two, upper and lower, reels are normally applied with braking force which is released when the reels are to be driven, so that the reels are positively held against rotation except when the tape reels are to be driven.

A further object of the present invention is to provide the magnetic recording and reproducing machine of the kind above-specified, in which the reel drive and the braking means are mechanically interconnected, so that the magazine is held against getting out of place on the machine during the period when the reels are being driven in the magazine.

There are other objects and particularities of the present invention which will be made obvious from the following detailed descriptions of preferred embodiments of the invention with reference to the accompanying drawings, in which FIG. 1 is a front elevational view of a magnetic recording and reproducing machine embodying the invention;

Figure 1:
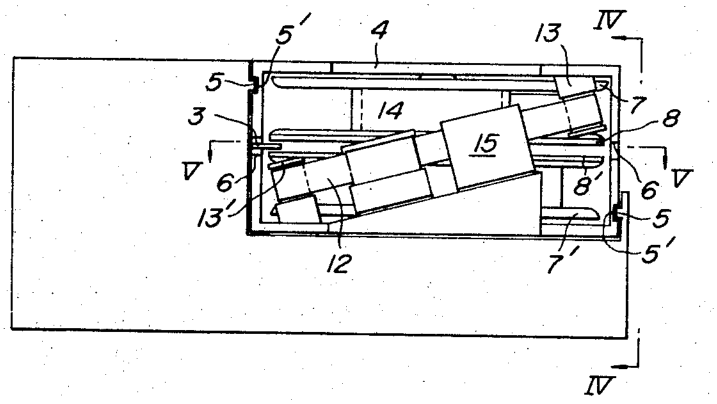
Figure 2:
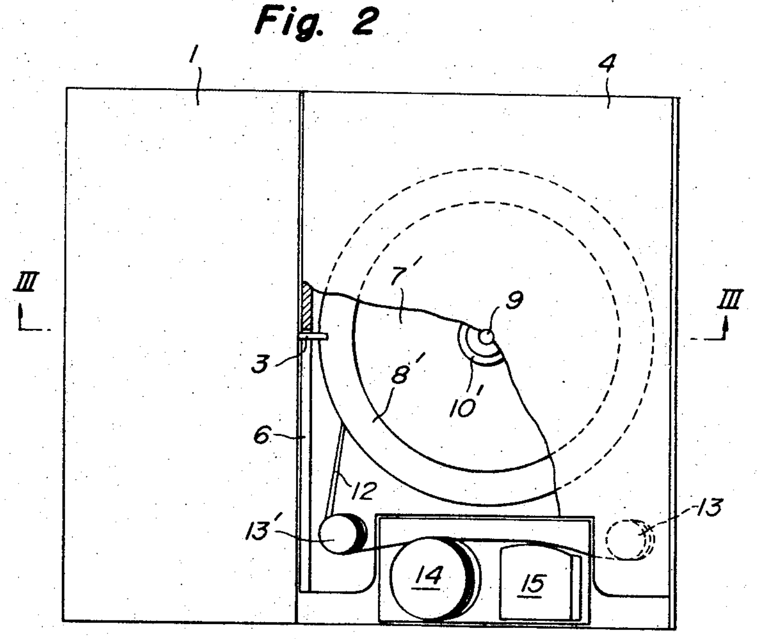
FIG. 2 is a plan view of the machine shown in FIG. 1, partly broken away.
Figure 3:
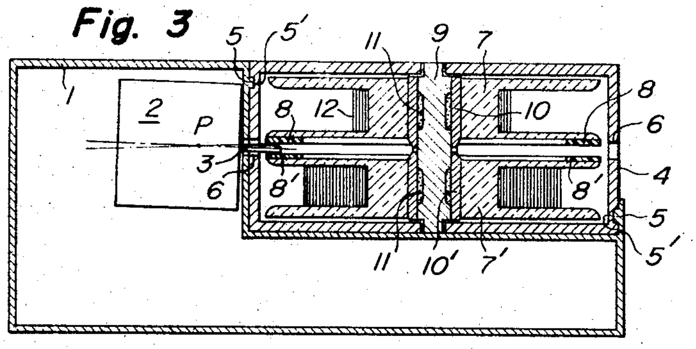
FIG. 3 is a cross-sectional view taken at line III—III in FIG. 2, parts not having direct connection with the invention being omitted for simplicity sake.
Figure 4:
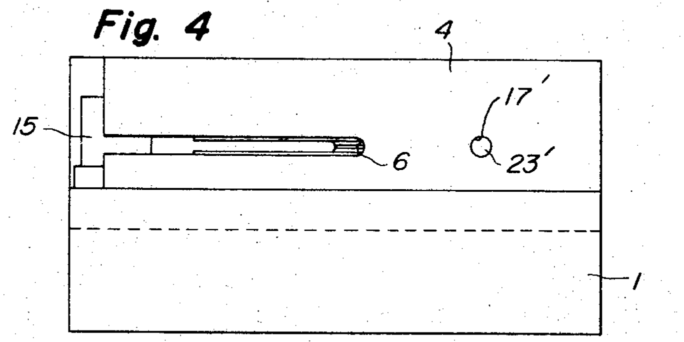
FIG. 4 is a side elevational view of the machine shown in FIG. 1, as seen in the direction shown by arrows IV—IV.

Referring to FIGS. 1 to 6, the magnetic recording and reproducing machine shown comprises a body casing 1, and an electric motor 2 having a driving shaft 3 and enclosed in the casing 1. The driving shaft 3 extends horizontally in general, but the electric motor as a whole is mounted swingable within a limited extent, so that the shaft 3 may be tilted up and down about a horizontal axis P. The casing 1 is so formed as to provide a room or recess for detachably receiving a tape magazine 4 which snuggly fits therein. The body casing 1 is provided with guide rails 5 at appropriate positions for cooperation with corresponding grooves 5′ formed on the opposite side walls of the magazine 4, whereby the tape magazine is properly positioned with respect to the machine body and also guided for its insertion into and withdrawal from the recess.

The driving shaft 3 projects from the casing 1 through a relatively large hole formed in the casing wall defining one side of the afore-mentioned recess or room for receiving the tape magazine 4. The tape magazine 4 is provided with horizontal slits 6 in its opposite side walls at such positions that either of the slits 6 receives the projecting end of driving shaft 3.

The tape magazine 4 is provided therein with a pair of tape reels 7 and 7′ in superposed relation with each other. The upper and lower reels 7 and 7′ are rotatably mounted separately on a common vertical shaft 9 through bearing sleeves 10 and 10′, respectively, with lubricating material 11 disposed therebetween. Reels 7 and 7′ are provided with friction rings 8 and 8′ of rubber or the like material, respectively, on the inner peripheries of reels 7 and 7″ in opposition to each other.

A magnetic tape 12 is wound and rewound from one reel 7 or 7′ to the other reel 7′ or 7 by way of a slanted path defined between stationary guide rollers 13 and 13′, passing through an erasing head 14 and recording-reproducing head 15 disposed along the slanted path.

When the tape magazine is properly positioned in the recess of casing 1, the driving shaft 3 of motor 2 extends between the friction rings 8 and 8′ of two reels, and when the motor 2 is tilted in either direction about the axis P, the shaft 3 contacts friction ring 8 or 8′ as the case may be, and drives the reel 7 or 7′.

For recording or reproducing operation, the operator actuates an operating handle or knob, not shown, suitably connected with the motor casing, in such a direction that the driving shaft 3 makes driving contact with the upper reel 7, while the lower reel 7′ is free to rotate, and the tape 12 is taken up by the upper reel 7 from the lower one. When the operator desires to rewind the tape 12, the operating handle is reversed so that the driving shaft 3 is tilted to make driving contact with the lower reel 7′, and the tape is rewound from the upper to the lower reel.

After a half-width recording or reproducing has been completed, the other half-width recording or reproducing operation may be effected by withdrawing the tape magazine 4 from the body casing 1 and re-inserting the same thereinto in the reversed position, upside down. Such a reversing operation may be effected speedily without need of any special attention.

Figure 5:
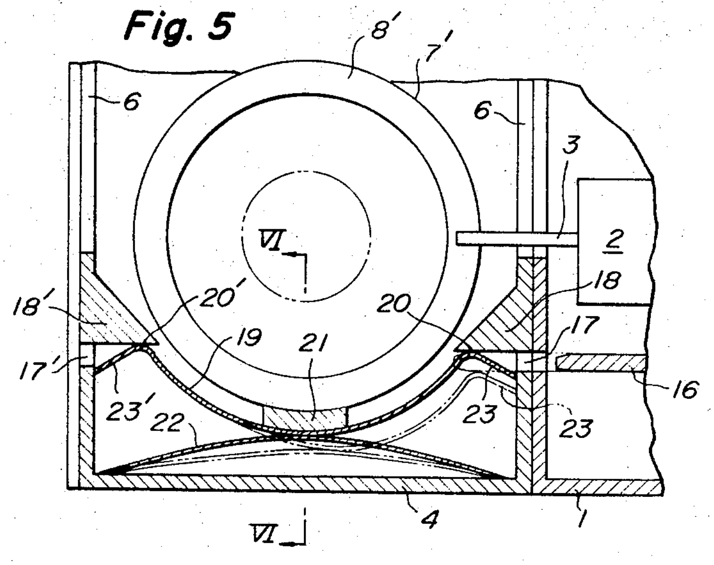
FIG. 5 is a fragmentary sectional plan view taken at line V—V in FIG. 1.
Figures 6, 7, 8:
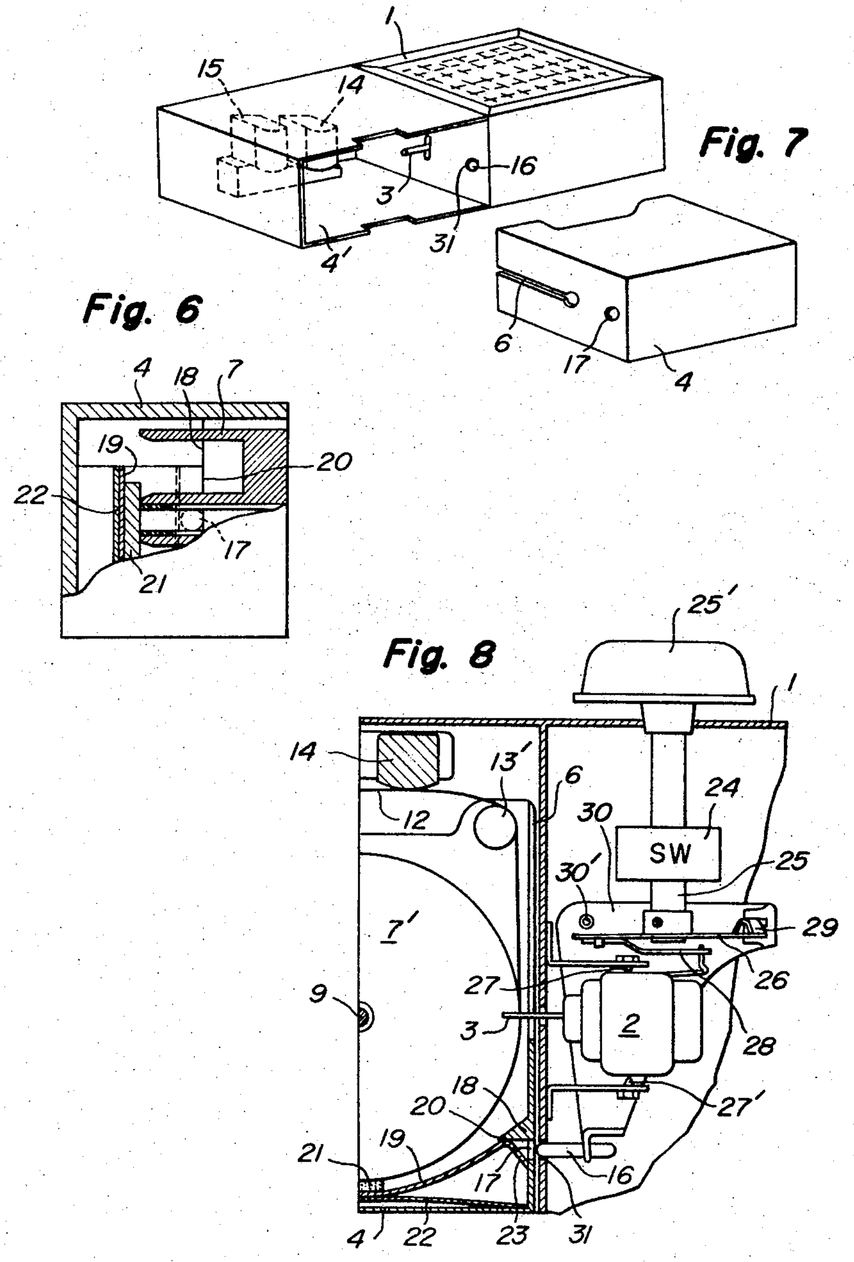
FIG. 6 shows a partial elevation of the magazine, partly in section taken at line VI—VI in FIG. 5.
FIG. 7 is a perspective view of another embodiment of the invention, with the tape magazine out of place from machine body.
FIG. 8 is a partial plan view of the machine shown in FIG. 7, partly in section, the parts being at standstill.

Referring particularly to FIGS. 5 and 6, the braking device associated with the two reels in the magazine 4 will now be described. The braking device is in interconnection with the reel drive operation.

When the tape magazine 4 is properly positioned in the afore-mentioned recess of body casing 1, a brake-releasing bar 16 may be inserted into the tape magazine through registering holes 17 or 17′ in the casing walls. The brake-releasing bar 16 is slidably mounted in the casing 1 and is mechanically connected with the control switch, not shown, of the driving motor 2, so that, when the control switch is closed for energizing the driving motor 2, the bar 16 is driven inserted into the tape magazine 4, but when the control switch is open, the bar 16 is retracted into the body casing 1 as shown in FIG. 5.

Within the magazine 4, substantially triangular projections 18 and 18' are provided on the side walls of the magazine 4 adjacent to the holes 17 and 17', respectively, and a brake spring 19 of arcuate configuration is mounted spanning between the projections 18 and 18' along the peripheries of reels 7 and 7'. The brake spring 19 is bent back near opposite ends to provide elbows 20 and 20' which are held in engagement with the projections 18 and 18', respectively, by means of a backing spring 22 arranged in the magazine 4 for applying a resilient force to the brake spring 19 in the direction towards the tape reels. The brake spring 19 carries a friction pad 21 of felt or like material at the central portion, which is adapted to engage the reel peripheries.

Normally, the brake device is held in brake-applying position as shown in FIGS. 5 and 6. The opposite end portions 23 and 23' of brake spring 19 beyond elbows 20 and 20' extend to cross diagonally the paths of brake-releasing bar 16. When, in response to closing of the control switch, the bar 16 is inserted into the tape magazine 4 through holes 17 or 17' as the case may be, it enters between the corresponding projection and the spring elbow, say 18 and 20, to displace the coresponding end of brake spring 19 away from the projection 20, as shown by imaginary lines in FIG. 5, thus releasing the reel brake by disengagement of the pad 21 from the reel peripheries.

When the control switch is operated to OFF position, the brake-releasing bar 16 is retracted into the body casing 1, and the brake spring 19 is allowed to return to the normal position for applying brake to the tape reels.

During the time the reel brake is in released position with the bar 16 positioned between the projection 18 or 18' and the spring elbow 20 or 20', the brake-releasing bar 16 also serves to lock the magazine 4 to the body casing 1, as will readily be understood.

Referring now to FIGS. 7 to 10, the embodiment shown comprises a tape magazine 4 adapted to be detachably received in a cavity or receiving station 4' associated with the body casing 1. The magnetic heads 14 and 15 are disposed within the cavity 4' in such positions that, when the magazine 4 is properly positioned in the cavity as fully described with reference to FIGS. 1 to 6, the magnetic tape, travelling through the inclined path from one to the other of the upper end lower reels in the magazine 4, passes through the magnetic heads in cooperative relation therewith.

Within the body casing 1 is provided a control switch 24 for controlling the driving motor 2. The switch 24 comprises a switching shaft 25 provided with an operating knob 25' at the outer end projecting outside the casing 1, and a control plate 26 fixed to the inner end of shaft 25. The driving motor 2 is pivotally mounted on a pair of brackets fixed to the appropriate casing wall, by means of pivot shafts 27 and 27'. The control plate 26 is operatively connected with the driving motor casing by means of a linkage 28. The driving shaft 3 of motor 2 extends into between the upper and lower reels, just as in the embodiment shown in FIGS. 1 to 6.

Figure 9:
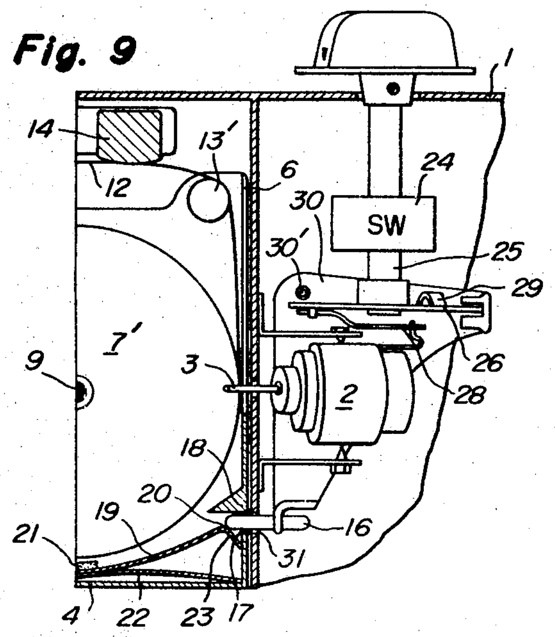
FIG. 9 is a view similar to FIG. 8, with the parts in recording or reproducing operation.
Figure 10:
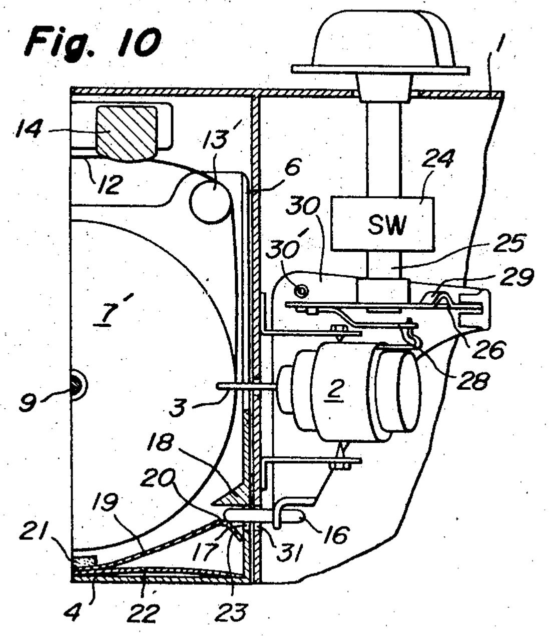
FIG. 10 is a view similar to FIG. 8, the parts being in rewinding operation.

When the machine is at a standstill, the parts take positions shown in FIG. 8. When the control switch 24 is actuated to the closed position for effecting recording or reproducing operation, the driving motor 2 is tilted by means of control plate 26 and linkage 28 to have the driving shaft 3 in driving contact with the upper reel 7 as shown in FIG. 9. When the control switch 24 is actuated to rewinding position, the switching shaft 25 actuates the control plate 26 and linkage 28 to tilt the driving motor 2 in the opposite sense to have the driving shaft 3 in contact with the lower reel 7' as shown in FIG. 10. The direction of rotation of the driving motor 2 is not changed, but the direction of rotation of the tape reels is reversed, as will readily be understood.

The brake-releasing bar 16 is carried by one corner of a triangular plate or actuating member 30 pivotally mounted on a stationary pivot pin 30', and when in the retracted position, the outer end of bar 16 rests in a hole 31 in the casing wall in registration with the hole 17 in the magazine wall. When the driving motor 2 is tilted in either direction for recording-reproducing operation or for rewinding, a camming face 29 formed on the control plate 26 cooperates with appropriate cam followers formed on the trangular plate 30 to move the latter in the clockwise direction in FIG. 8, to have the brake-releasing bar 16 entered into the tape magazine for releasing the reel brake, just in the manner described in connection with FIGS. 5 and 6.

What is claimed is:

1. In a magazine type magnetic recording and reproducing machine including a body casing having a receiving station for receiving a detachable tape magazine containing a pair of tape reels mounted in superposed relation and including a braking device for normally applying a brake to said tape reels, a reversible drive mechanism comprising:

- a driving motor tiltably mounted within said body casing, said driving motor having an extended driving shaft projecting into said tape magazine receiving station between said pair of superposed tape reels when said tape magazine is in position in said receiving station;
- tilting means for tilting said driving motor about an axis perpendicular to the driving shaft of said motor so as to selectively bring said driving shaft into contact with one of said tape reels in order to wind the tape in one direction or the other of said tape reels in order to wind the tape in the opposite direction;
- a motor switch for energizing said driving motor;
- control means connected to said motor switch and said tilting means for simultaneously operating said motor switch to energize said driving motor and said tilting means to bring said driving shaft into contact with one or the other of said tape reels; and brake releasing means connected to said control means for releasing said brake from said tape reels simultaneously with the tilting and energization of said driving motor.

2. A magazine type magnetic recording and reproducing machine, a reversible drive mechanism of the type described in claim 1 wherein said control means comprises:

- a manually operable control knob mounted on the exterior of the body casing of said machine, said control knob having a forward position, a reverse position, and a stop position intermediate between said forward and reverse positions; and
- a shaft connected to said control knob and extending into the interior of said body casing, said shaft being connected to said tilting means, said motor switch and brake releasing means.

3. In a magazine type magnetic recording and reproducing machine, a reversible drive mechanism of the type described in claim 2 wherein said tilting means comprises:

- a control plate mounted on said control shaft and a linkage connecting said control plate to the casing of said driving motor so that when said control knob is turned to the forward position, said driving motor is tilted so as to bring said driving shaft into contact with one of said tape reels, and when said control knob is turned to the reverse position, said driving motor is tilted so as to bring said driving shaft into contact with the other of said tape reels.

4. In a magazine type magnetic recording and reproducing machine, a reversible drive mechanism of the type described in claim 3 wherein said brake releasing means comprises:

- a brake releasing bar mounted for extension into said tape magazine receiving station,
- an actuating member connected to said brake releasing bar and pivoted on said body casing, a cam follower mounted on said actuating member, and a cam surface mounted on said control plate, said cam surface cooperating with said cam follower to extend said brake releasing bar into said tape magazine so as to release said normally applied brake when said control knob is in the forward or reverse position, and to retract said brake releasing bar when said control knob is in the stop position.

5. A magazine type magnetic recording and reproducing machine comprising:

a body casing having a tape magazine receiving station, a detachable tape magazine containing a pair of tape reels rotatably mounted in superposed spaced relation, friction rings mounted on the opposing peripheries of said tape reels, a magnetic tape windable on both tape reels through an inclined path defined between said reels, and a braking device for normally braking said tape reels;

a magnetic head mounted on said body casing within said receiving station for cooperation with said magnetic tape along said inclined path when said detachable tape magazine is in position in said receiving station;

electrical means connected to said magnetic head for recording and reproducing sound signals on said magnetic tape;

a driving motor tiltably mounted within said body casing, said driving motor having an extended driving shaft projecting into said receiving station between said tape reels when said detachable tape magazine is in position;

tilting means for tilting said driving motor about an axis perpendicular to the shaft of said motor so as to bring said driving shaft into contact with one or the other of said friction rings on said tape reels;

a brake releasing bar mounted within said body casing for extension into said tape magazine receiving station so as to release said braking device in said tape magazine; and means connected to said tilting means for extending said brake releasing bar in response to the tilting of said driving motor.

References Cited

UNITED STATES PATENTS

| | | | |
|---|---|---|---|
| 2,706,638 | 4/1955 | Bruderlin et al. | 179—100.2 |
| 3,107,279 | 10/1963 | Hanes et al. | 179—100.2 |
| 3,250,481 | 5/1966 | Seki. | |

OTHER REFERENCES

O'Connell: "Mechanical Brake for Tape Cartridge Recorder," RCA Technical Notes, RCA TN No. 252, June 1959.

BERNARD KONICK, *Primary Examiner.*

L. KURLAND, *Assistant Examiner.*